United States Patent
Bowling

(10) Patent No.: US 7,798,559 B2
(45) Date of Patent: Sep. 21, 2010

(54) METHOD OF TRANSPORTING POULTRY

(75) Inventor: Jeffrey L. Bowling, Middlesboro, KY (US)

(73) Assignee: Wastequip Manufacturing Company, Beachwood, OH (US)

( * ) Notice: Subject to any disclaimer, the term of this patent is extended or adjusted under 35 U.S.C. 154(b) by 0 days.

(21) Appl. No.: 12/389,437

(22) Filed: Feb. 20, 2009

(65) Prior Publication Data

US 2009/0155041 A1 Jun. 18, 2009

Related U.S. Application Data

(62) Division of application No. 11/978,080, filed on Oct. 26, 2007, now Pat. No. 7,510,233, which is a division of application No. 11/377,779, filed on Mar. 16, 2006, now Pat. No. 7,287,807.

(60) Provisional application No. 60/662,204, filed on Mar. 16, 2005.

(51) Int. Cl.
*B60J 5/06* (2006.01)
(52) U.S. Cl. .................. 296/186.2; 296/24.31
(58) Field of Classification Search ............. 296/186.2, 296/24.31, 138, 100.13, 155, 105; 119/453
See application file for complete search history.

(56) References Cited

U.S. PATENT DOCUMENTS

| | | | |
|---|---|---|---|
| 1,432,439 A | 10/1922 | Bixler | |
| 2,099,774 A * | 11/1937 | Spencer | 119/402 |
| 3,146,017 A | 8/1964 | Yeary | |
| 3,292,581 A * | 12/1966 | Van Nest | 119/453 |
| 3,453,020 A * | 7/1969 | Santillo, Jr. | 296/186.2 |
| 3,476,084 A | 11/1969 | Nater | |
| 3,633,963 A * | 1/1972 | Haynes | 296/24.31 |
| 3,687,330 A * | 8/1972 | Herolzer | 220/345.2 |
| 3,709,552 A | 1/1973 | Broadbent | |
| 3,740,092 A | 6/1973 | Page | |
| 3,836,769 A | 9/1974 | Wilson | |
| 3,895,587 A | 7/1975 | Bell | |
| 3,940,174 A | 2/1976 | Mayes | |
| 4,084,714 A * | 4/1978 | Williams | 414/498 |
| 4,335,915 A * | 6/1982 | Knapp | 296/98 |
| 4,545,611 A | 10/1985 | Broadbent | |
| 4,722,655 A * | 2/1988 | Bonerb | 414/288 |

(Continued)

*Primary Examiner*—Kiran B. Patel
(74) *Attorney, Agent, or Firm*—Sand & Sebolt

(57) ABSTRACT

A method for transporting poultry in a coop trailer that includes a trailer section which can carry a number of tiers of poultry cages on its bed and has a vertically oriented tarpaulin system mounted thereon. The tarpaulin system includes tarpaulins which are suspended from a cable that extends between the front and rear ends of the trailer section. The tarpaulins can rapidly and easily be drawn back and forth along the sides of the trailer section to cover and uncover the cages. When the tarpaulins are fully extended along the sides of the trailer section, the tarpaulins effectively aid in preventing the birds from being buffeted about by excessive wind as the coop trailer travels along the roads. The tarpaulins also aid in maintaining a more constant temperature within the trailer section. The tarpaulins can be quickly and easily withdrawn and rotated to lay adjacent one of the front and rear ends of the trailer section and can be secured in that position so as to allow for the loading or removal of the cages from the trailer section.

9 Claims, 17 Drawing Sheets

U.S. PATENT DOCUMENTS

| | | | |
|---|---|---|---|
| 4,762,361 A * | 8/1988 | Horton et al. ............ 296/186.2 |
| 4,795,208 A * | 1/1989 | Whiteman ............... 296/186.2 |
| 4,828,316 A | 5/1989 | Bennett et al. |
| 4,844,524 A | 7/1989 | Pastva |
| 4,856,843 A * | 8/1989 | Elliott .................... 296/186.4 |
| 4,861,215 A | 8/1989 | Bonerb |
| 4,884,496 A * | 12/1989 | Donavich .................... 454/88 |
| 4,943,110 A | 7/1990 | Pastva |
| 5,007,672 A | 4/1991 | Koch |
| 5,080,422 A | 1/1992 | DeMonte et al. |
| 5,176,388 A | 1/1993 | Horton |
| 5,215,349 A | 6/1993 | Horton |
| 5,282,663 A * | 2/1994 | Horton ...................... 296/155 |
| 5,466,030 A * | 11/1995 | Harris et al. .................. 296/98 |
| 5,658,037 A | 8/1997 | Evans et al. |
| 6,183,036 B1 * | 2/2001 | Coulson ................ 296/100.13 |
| 6,375,248 B1 | 4/2002 | Bergstrom |
| 6,564,752 B2 * | 5/2003 | Jerome ...................... 119/845 |
| 6,612,638 B1 * | 9/2003 | Fliege et al. ................ 296/138 |
| 6,634,697 B1 * | 10/2003 | Petelka .................. 296/100.12 |
| 6,848,987 B2 * | 2/2005 | Draft ........................... 452/66 |
| 6,851,389 B2 * | 2/2005 | Giordano et al. ............ 119/453 |
| 6,877,794 B2 * | 4/2005 | Bush, Sr. ................. 296/186.2 |
| 7,210,726 B2 | 5/2007 | Merlot et al. |
| 2004/0066052 A1 | 4/2004 | Payne |
| 2004/0100124 A1 | 5/2004 | Bush |
| 2005/0166859 A1 * | 8/2005 | Weaver ...................... 119/453 |

* cited by examiner

METHOD OF TRANSPORTING POULTRY

CROSS-REFERENCE TO RELATED APPLICATIONS

This is a divisional application of U.S. application Ser. No. 11/978,080 filed Oct. 26, 2007, which is a divisional application of U.S. application Ser. No. 11/377,779 filed Mar. 16, 2006, now U.S. Pat. No. 7,287,807, which application claimed priority from U.S. Provisional Application Ser. No. 60/662,204 filed Mar. 16, 2005; the entire specifications of which are incorporated herein by reference.

BACKGROUND OF THE INVENTION

1. Technical Field

This invention generally relates to methods of transportation. More particularly, the invention relates to a method for transporting livestock. Specifically, the invention relates to a method for transporting poultry in a coop trailer that includes a tarpaulin system and in which a tarpaulin is drawn across the trailer to cover the poultry cages during transport to reduce the number of deaths of the birds from buffeting and exposure.

2. Background Information

One of the most common ways for transporting poultry around the country from farm to farm or from farm to processing plant is through the use of large, specially designed transport trucks called coop trailers. These coop trailers typically have several tiers of cages within them into which the poultry is loaded. In the winter months, the birds tend to huddle together to keep warm and in the summer they fight for shade. This causes the weaker birds to suffocate. Furthermore, the rapid flow of air through the coop trailer as it travels along the highways can lead to the birds losing a lot of feathers. This decreases their ability to stay warm in winter and cool in summer and consequently leads to a greater loss of life. These losses increase the costs of transporting and processing poultry.

There is therefore a need in the art for providing a coop trailer and method for transporting poultry which tends to aid in reducing the number of deaths of the birds during transportation.

SUMMARY OF THE INVENTION

The present invention comprises a method of transporting poultry in a coop trailer that has a number of tiers of poultry cages and has a vertically oriented tarpaulin system disposed on either side of the trailer section thereof. In this system, a tarpaulin is suspended from each of a pair of spaced-apart cables that extend from the front to the rear of the trailer section and along the sides thereof. While the poultry is being transported, the tarpaulins are drawn along the sides of the trailer section to substantially prevent wind flow therethrough. The system is also provided with a pair of rotatable spars onto which the tarpaulins may be retracted. The spars are rotated so that the tarpaulins are moved from laying adjacent the sides of the trailer section to adjacent one of the front and rear ends of the trailer section. When the cages are to be loaded onto or removed from the trailer section, the tarpaulins are retracted from along the sides of the trailer section and are rotated to lay adjacent the one of the front and rear ends thereof. A securing mechanism is provided to keep the tarpaulins in contact with the one of the front and rear ends of the trailer section when the tarpaulins are in this position. The securing mechanism may include rotatable gates, straps and a portion of each the cables.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

DETAILED DESCRIPTION OF THE INVENTION

Figure 1:
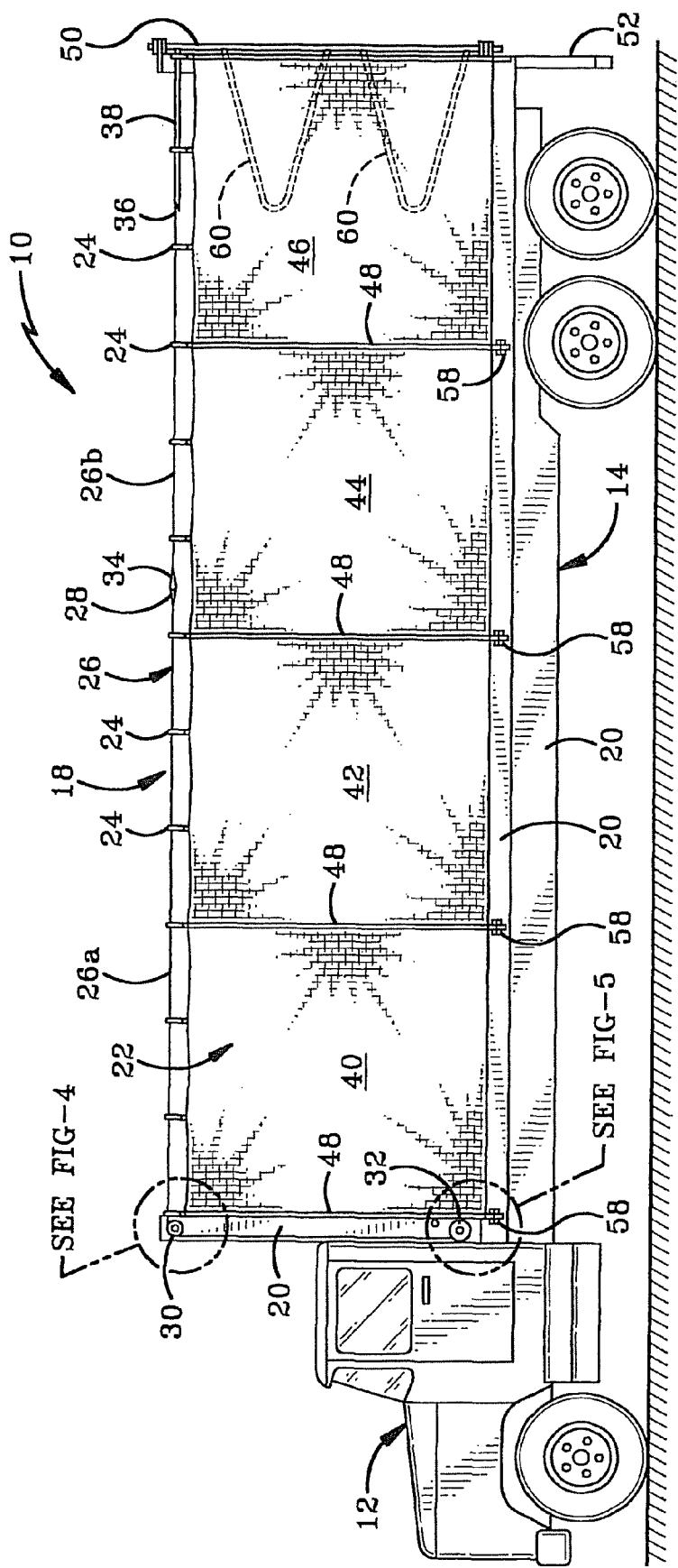
FIG. 1 is a side elevational view of a coop trailer with a vertical tarpaulin system drawn over the sides thereof to block free flow of air therethrough.
Figure 2:
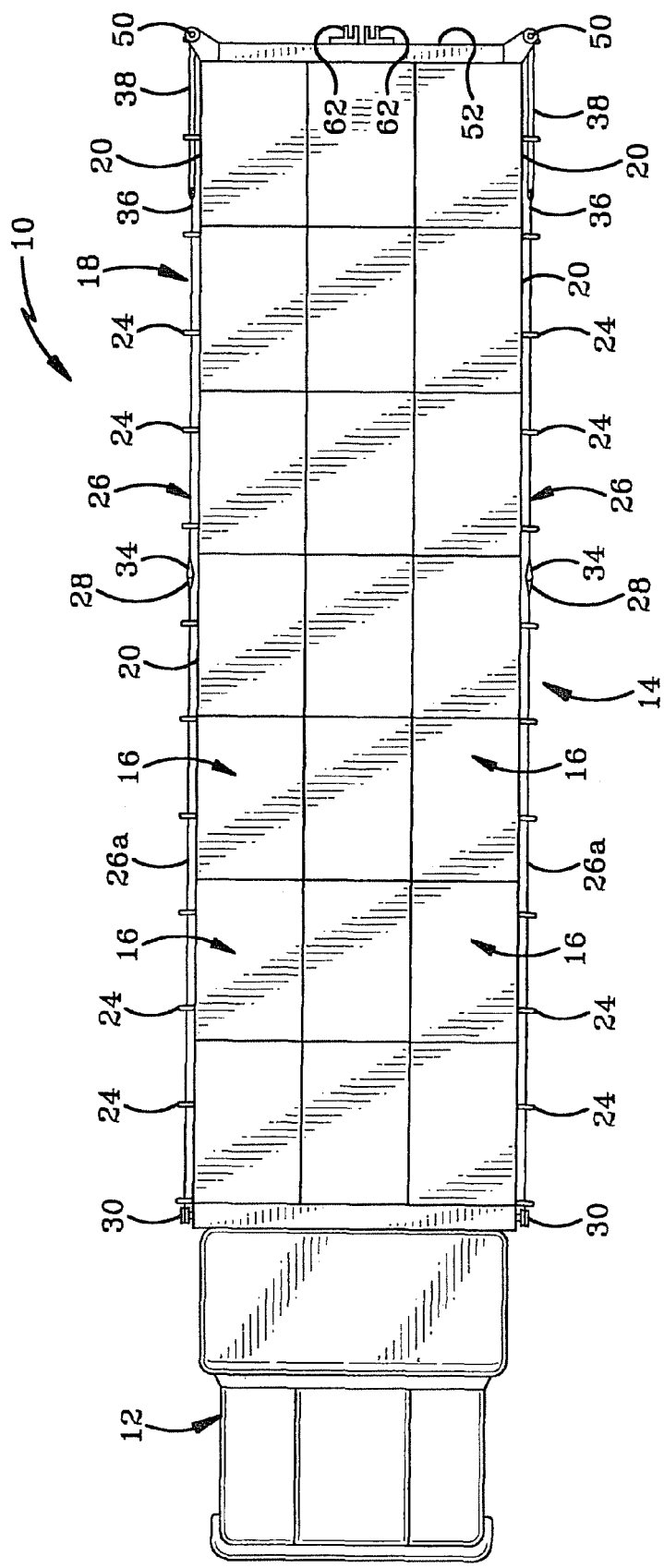
FIG. 2 is a top view of the coop trailer of FIG. 1.
Figure 3:
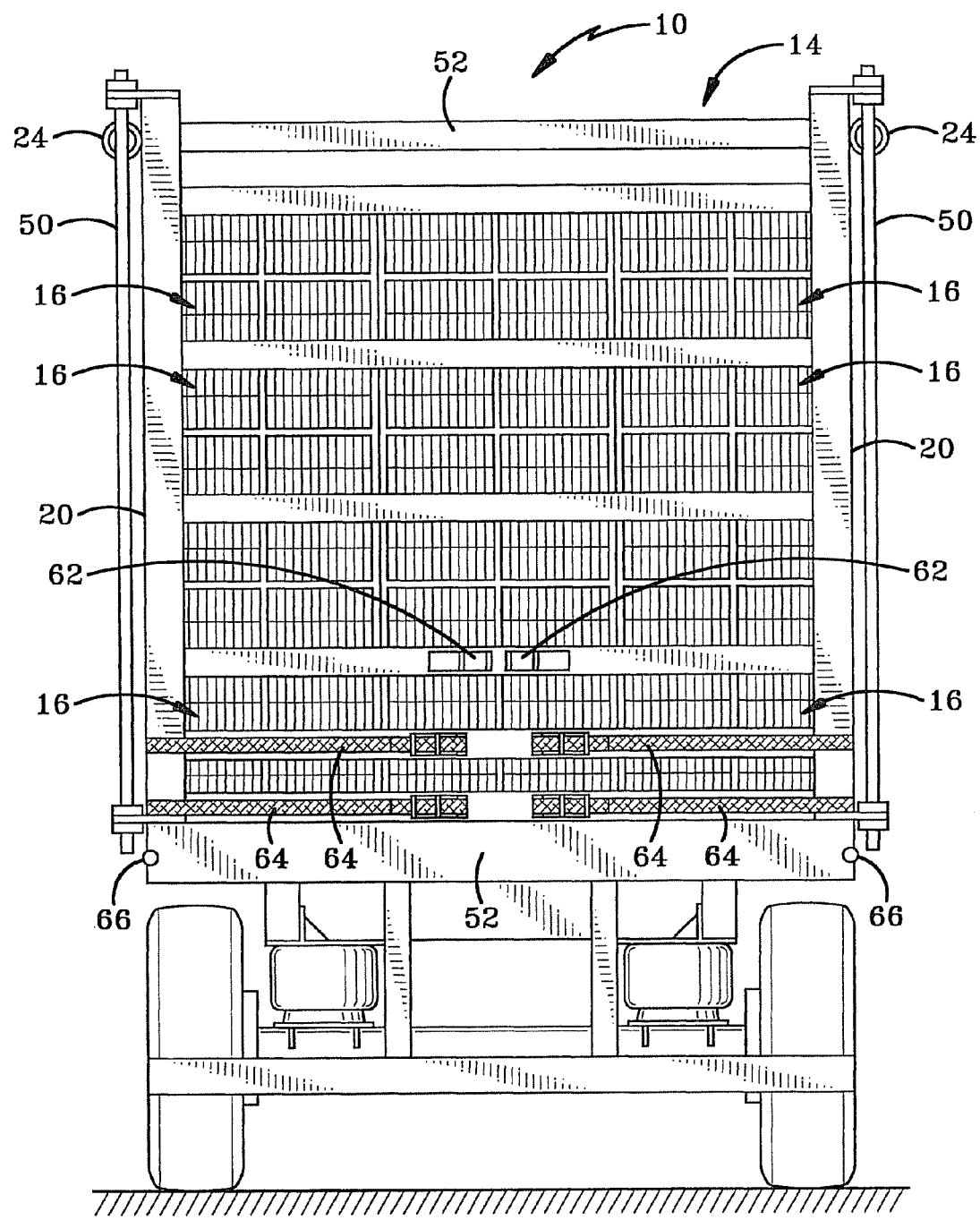
FIG. 3 is a rear elevational view of the coop trailer of FIG. 1.
Figure 4:
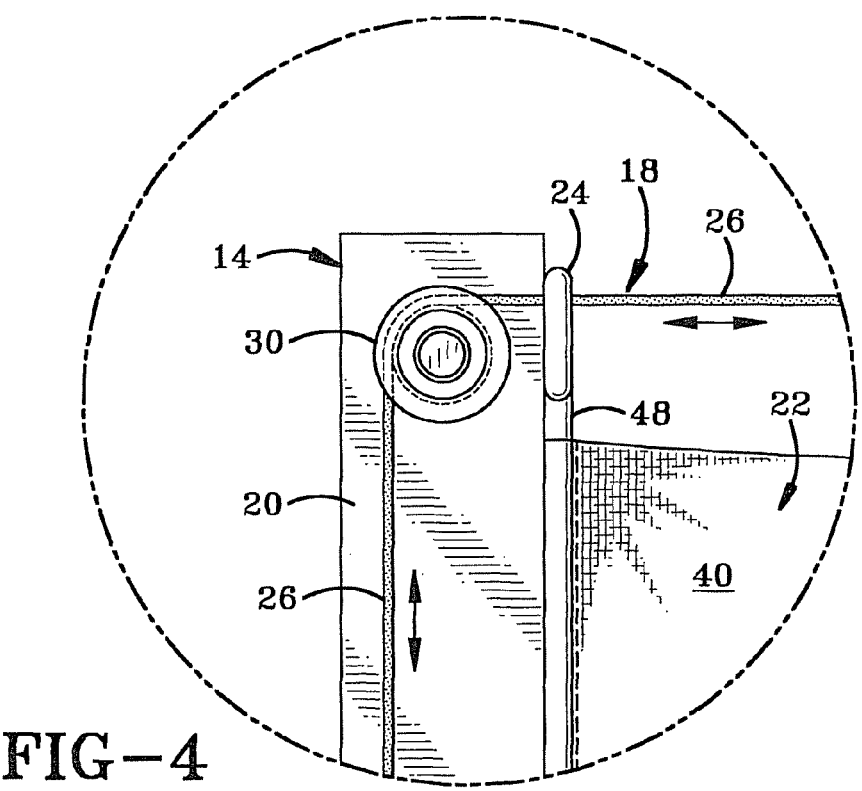
FIG. 4 is an enlarged side view of the uppermost circle shown in FIG. 1 showing the upper pulley of the tarpaulin system in greater detail.

Referring to FIGS. 1-3, there is shown a poultry coop trailer in accordance with the present invention and generally indicated at 10. Trailer 10 typically includes a tractor section 12 and a trailer section 14. Trailer section 14 is designed to carry a plurality of tiered cages 16 in which poultry (not shown) may be transported. Coop trailer 10 further includes a tarpaulin system, generally indicated at 18 which is used to selectively cover the sides 20 of trailer section 14 as needed.

Tarpaulin system 18 comprises a pair of tarpaulins 22 each mounted via a plurality of rings 24 onto one of a pair of cables 26. The following description references only one cable 26 and its associated tarpaulin 22, but it will be understood that it applies to both of the cables 26 and sheets 22.

Each cable 26 is used to support one of the tarpaulins 22 so that the sheet 22 may be selectively drawn across trailer section 14 or retracted therefrom. Cable 26 is comprised of a first section 26a and a second section 26b that may be detachably joined together. First section 26a of each cable 26 has a first end 28 and a second end (not shown) with a length of cable disposed thereinbetween. Similarly, second section 26b has a first end 34 and a second end 36 with a length of cable thereinbetween. The second end of first section 26a is secured to a lower winch 32, a portion of cable 26 is wound around winch 32, extends upwardly, wraps around an upper pulley 30 and terminates in the first end 28 thereof. Second end 36 of second section 26b is secured to a support spar 38 mounted on a rear end 52 (FIG. 2) of trailer section 14, and a portion of cable 26 extends outwardly away therefrom and terminates in first end 34. First ends 28 and 34 are selectively securable to each other as will be hereinafter described so that cable 26 extends effectively between lower winch 32 and support spar 38.

Each tarpaulin 22 is made up of a plurality of panels 40, 42, 44 and 46 which are connected together at stiffening ribs 48. Rings 24 are secured to the upper edges of each of panels 40, 42, 44 and 46 and are also connected to the upper ends of each rib 48. Cable 26 is threaded through rings 24 on tarpaulin 22 so that the sheet is suspended therefrom and may be drawn along cable 26 in a manner similar to a drape on a curtain rod. A first end of panel 42 is connected to a first rib 48a and a second end is connected to a second rib 48b. A first end of panel 44 is connected to second rib 48b and a second end thereof is connected to third rib 48c. A first end of panel 46 is connected to third rib 48c and a second end thereof is connected to fourth rib 48d. Finally, a first end of panel 46 is connected to fourth rib 48d and a second end thereof is connected to a vertical support rod 50 which is mounted at the intersection of side 20 of trailer section 14 and rear end 52 thereof. Ribs 48a, 48b, 48c and 48d are movably supported on cable 22 and support rod 50 is fixedly mounted. Support spar 38 extends outwardly away from rod 50 and is pivotable about rod 50.

Figure 5:
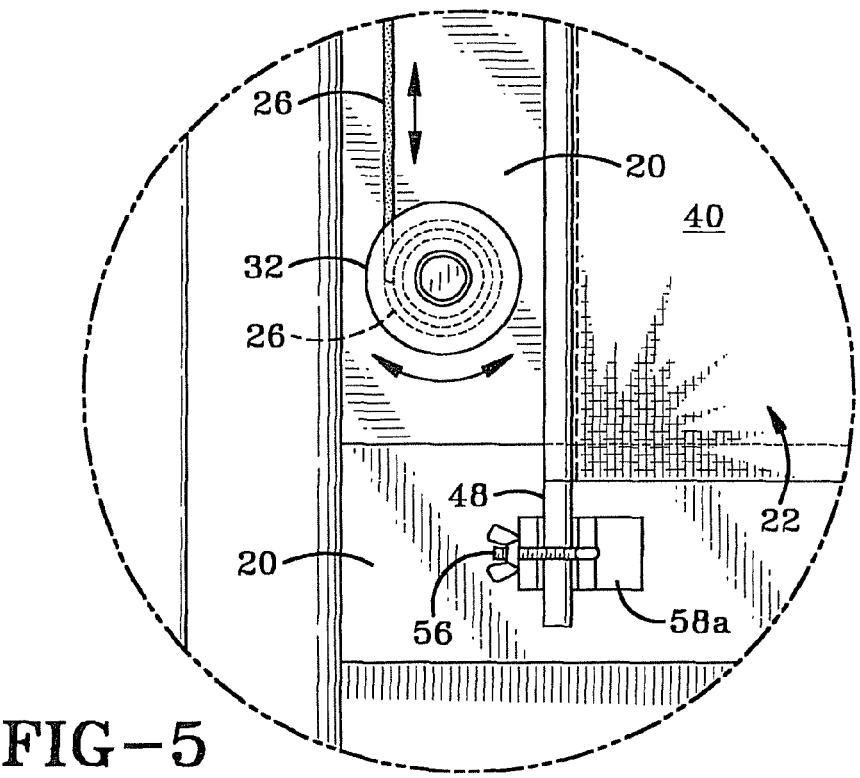
FIG. 5 is an enlarged side view of the lowermost circle in FIG. 1 showing the lower winch of the tarpaulin system in greater detail.

As may be seen in FIG. 5, the lower end of each rib 48a-48d is secured to a connector 58a, 58b, 58c and 58d, respectively. In each instance, a bolt 56 of any one of the connectors 58 clamps the lower end of the rib 48 against side 20 of trailer section 14 and prevents the same from moving. It will be understood that other securing means could be provided to lock lower ends of ribs 48a-48d to sides 20. For example, an aperture (not shown) may be provided in the lower end of the rib and the bolt 56 could pass through the aperture. Connectors 58 are positioned at intervals along each the side 20 of trailer section 14. The intervals correspond to the spacing between adjacent ribs 48 on tarpaulin 22 when the sheet is in a fully extended state. When tarpaulin 22 is drawn across the side 22 of trailer section 14, the lower ends of ribs 48a-48d are secured in place by connectors 5. Because the intervals between adjacent connectors 58 correspond to the distance between adjacent ribs, 48a-48d, panels 40, 42, 44, 46 are pulled taut. This keeps tarpaulins 22 in close contact with sides 20 of trailer section 14 and blocks access to cages 16.

Figure 7:
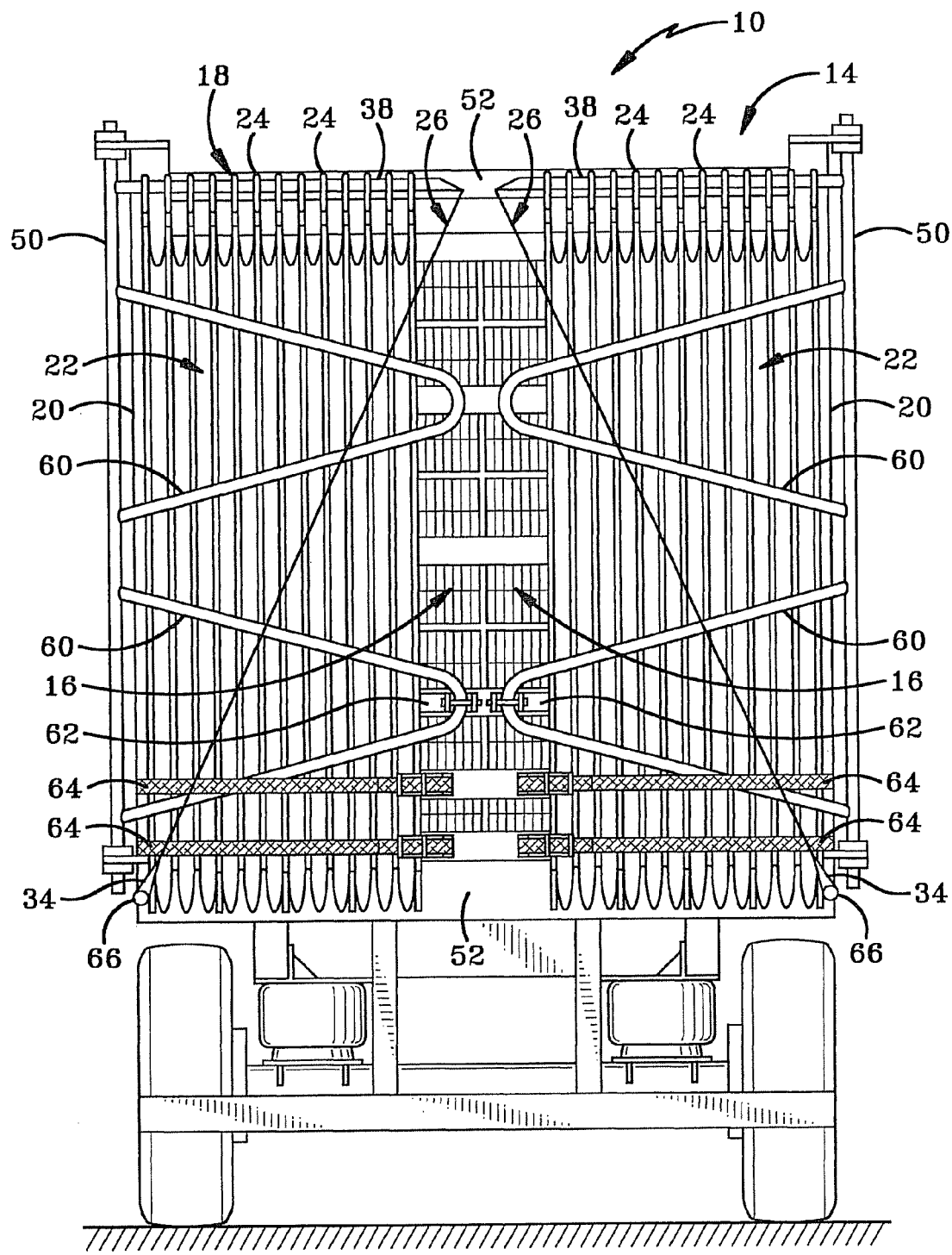
FIG. 7 is a rear elevational view of the trailer section showing the support spars and tarpaulin secured in abutting contact with the rear end of the trailer section.
Figure 8:
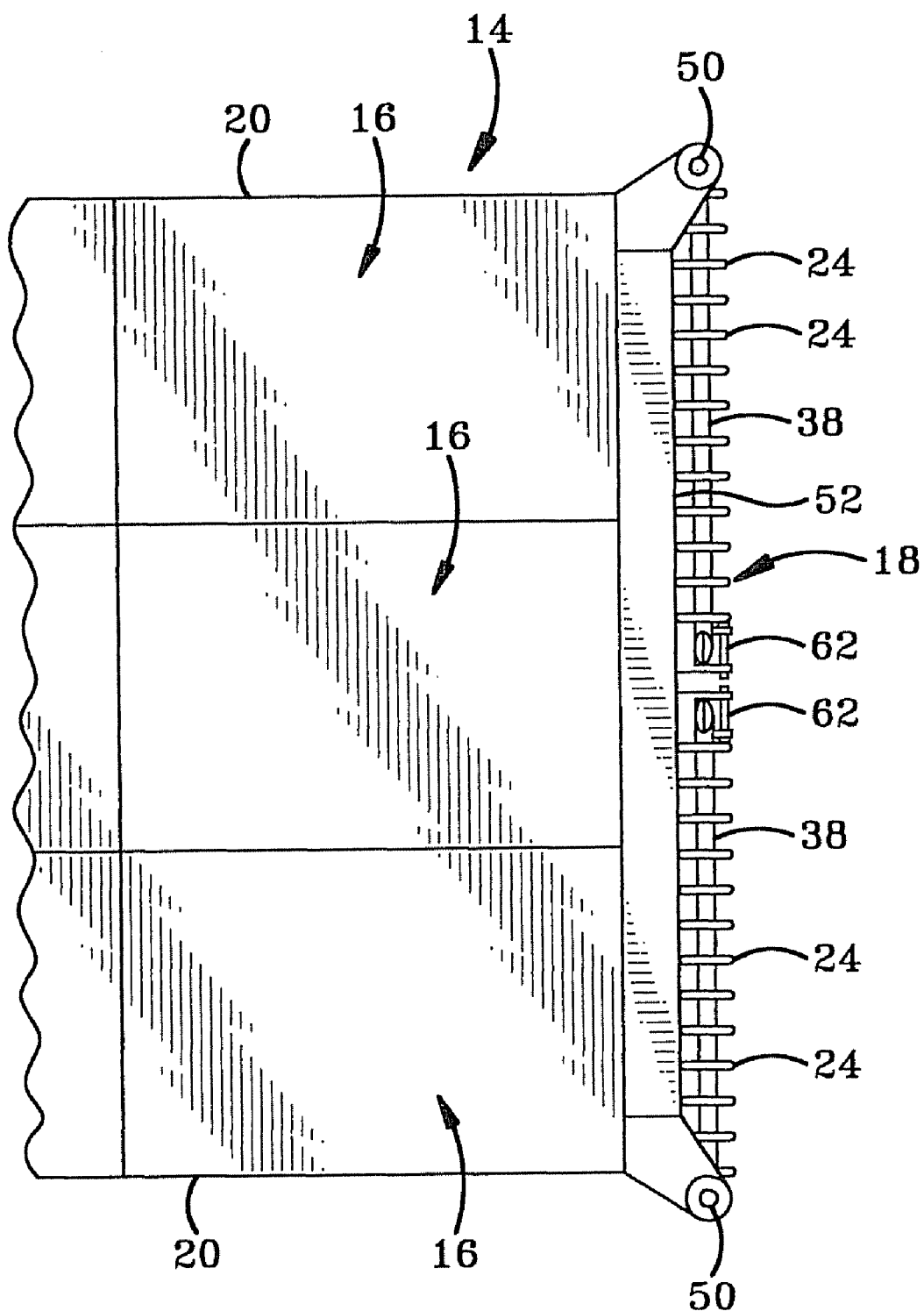
FIG. 8 is a partial top view of the rear end of the trailer section showing the support spars in abutting contact with the rear end of the trailer section.

A mechanism is also provided for securing tarpaulins 22 when they are fully retracted and are not covering sides 20 of trailer section 14. This mechanism includes a plurality of gates 60 that extend outwardly away from rod 50 (FIG. 1) and in substantially the same direction as support spar 38. Gates 60 are pivotable about rod 50 between a first position where they lie along rear end 52 of trailer section 14 (FIG. 7) and a second position where they lie along the side 20 of trailer section 14 (FIG. 1). Gates 60 are selectively secured against rear end 52 of trailer section 14 by catches 62 (FIG. 3). A plurality of straps 64 (FIG. 3) are also provided to hold tarpaulin 22 against rear end 52 of trailer section 14. Additionally, the first ends 34 of second cable section 26b preferably are drawn across tarpaulins 22 and are connected to pins 66 (FIG. 7). This not only holds sheets 22 in place, but also prevents cable 26 from flapping around.

Figure 6:
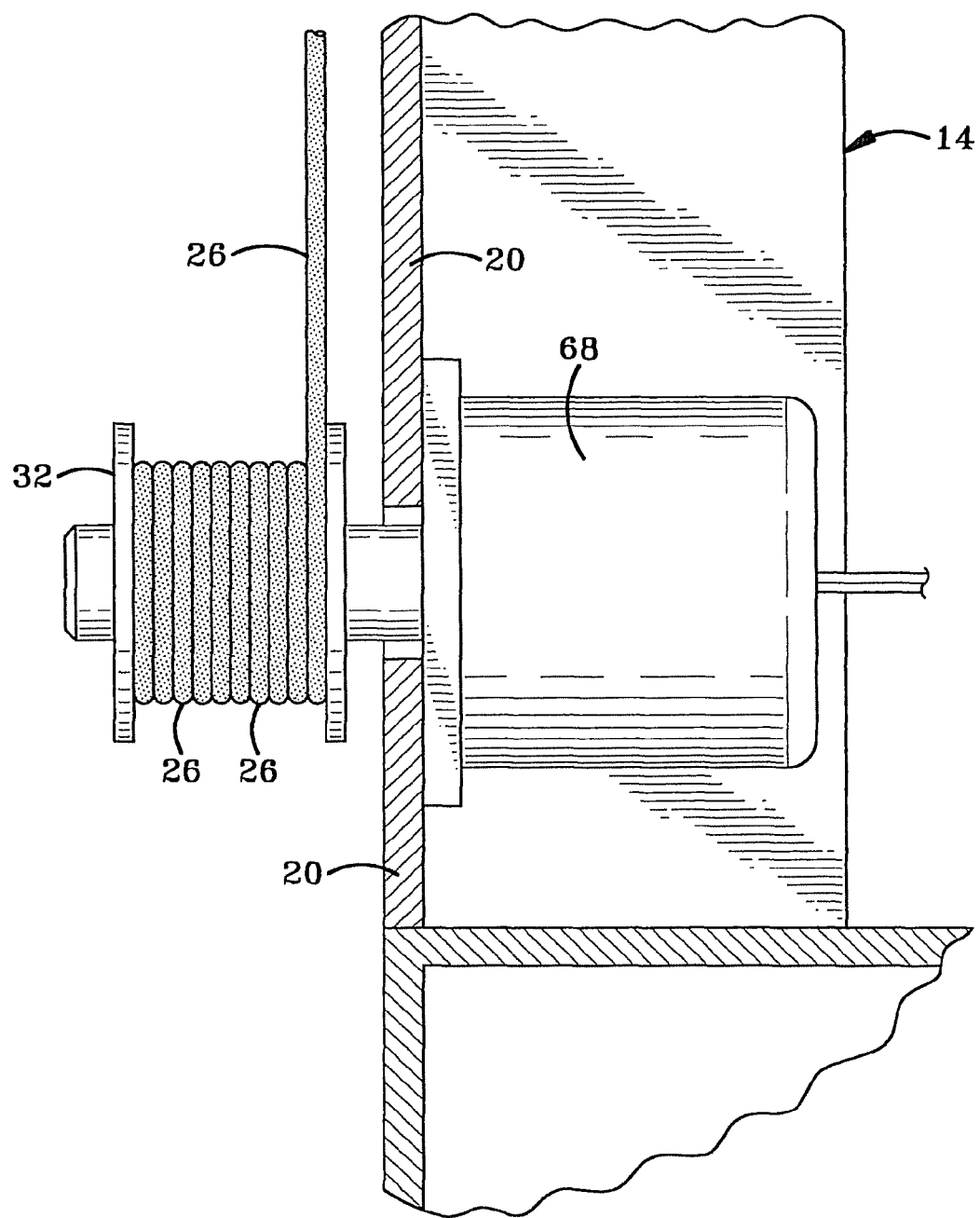
FIG. 6 is a partial cross-sectional rear view of the lower winch.
Figure 9:
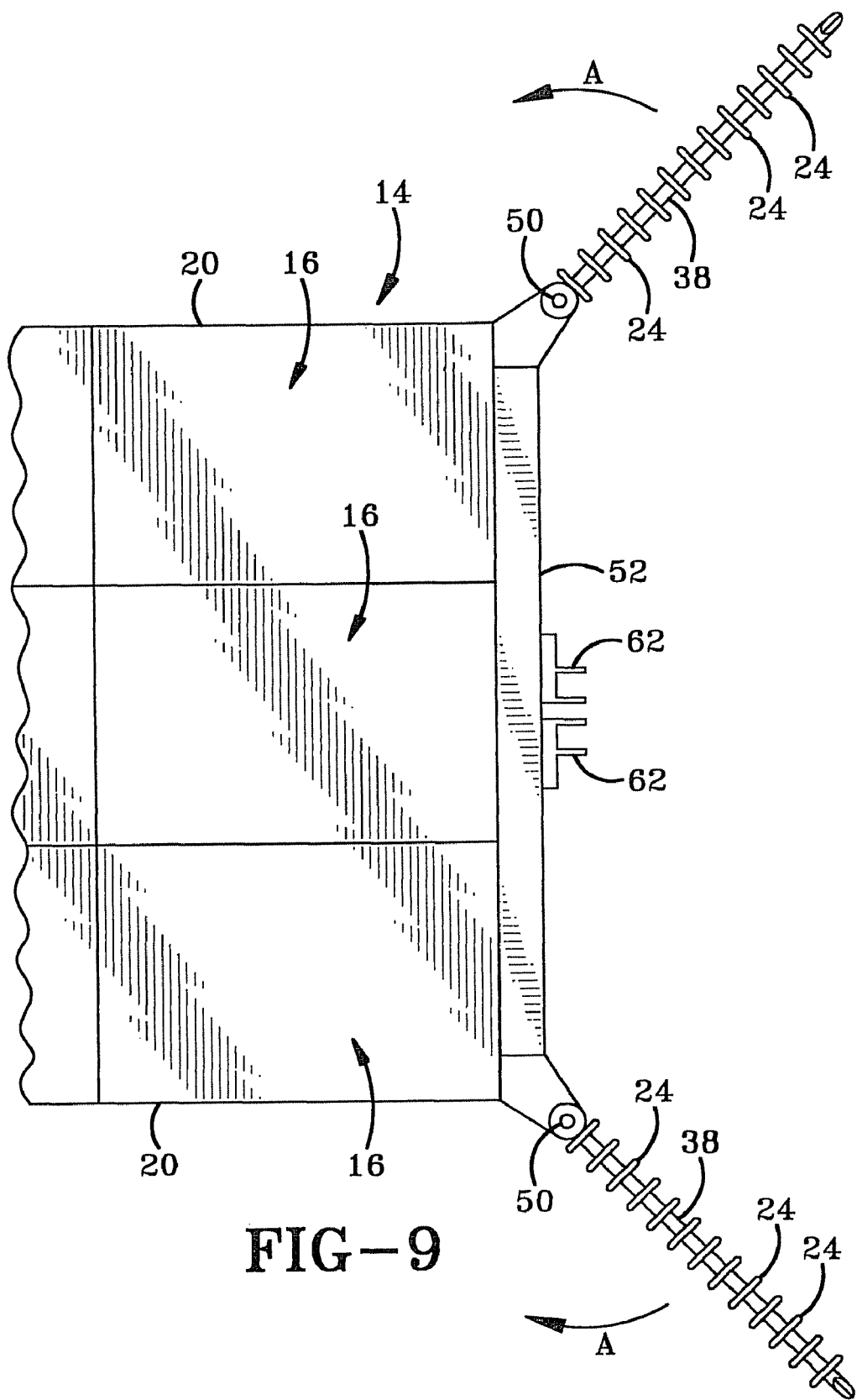
FIG. 9 is a partial top view of the rear end of the trailer section showing the support spars being rotated into position for use.
Figure 10:
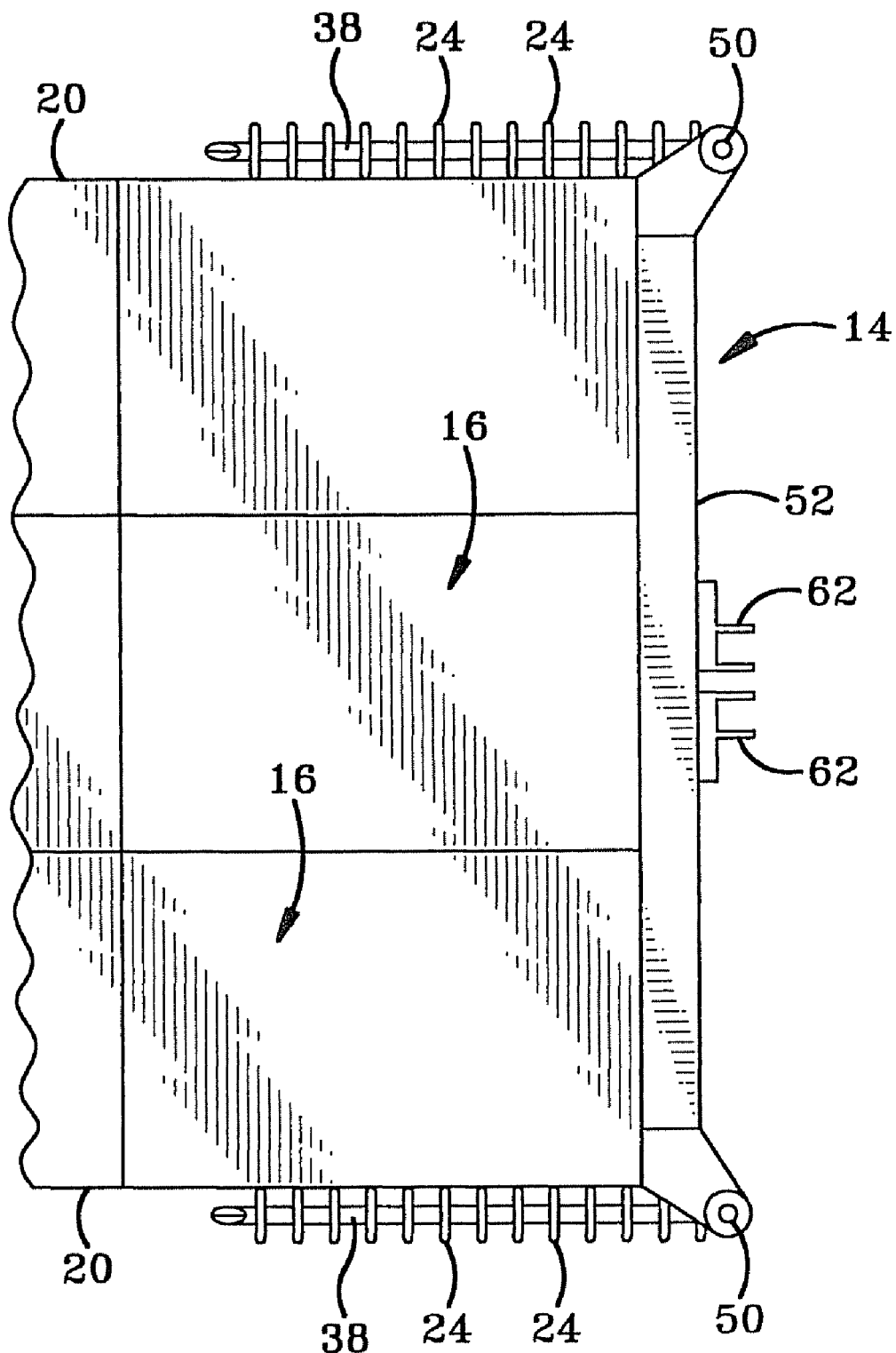
FIG. 10 is a partial top view of the rear end of the trailer section showing the tarpaulin being held on the support spars.
Figure 12:
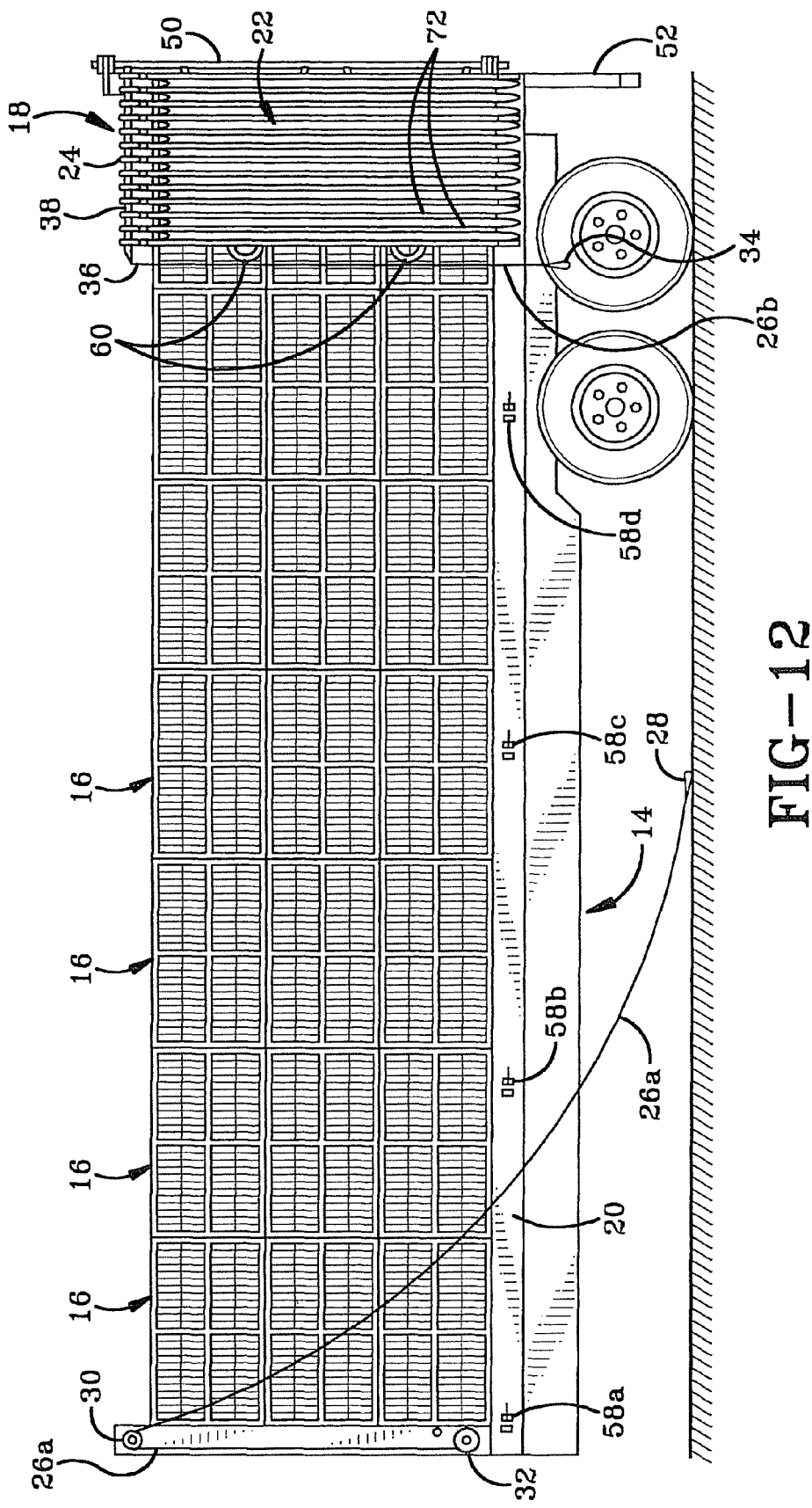
FIG. 12 is a side elevational view of the trailer section showing the first and second sections of the cable being readied for attachment to each other.
Figure 13:
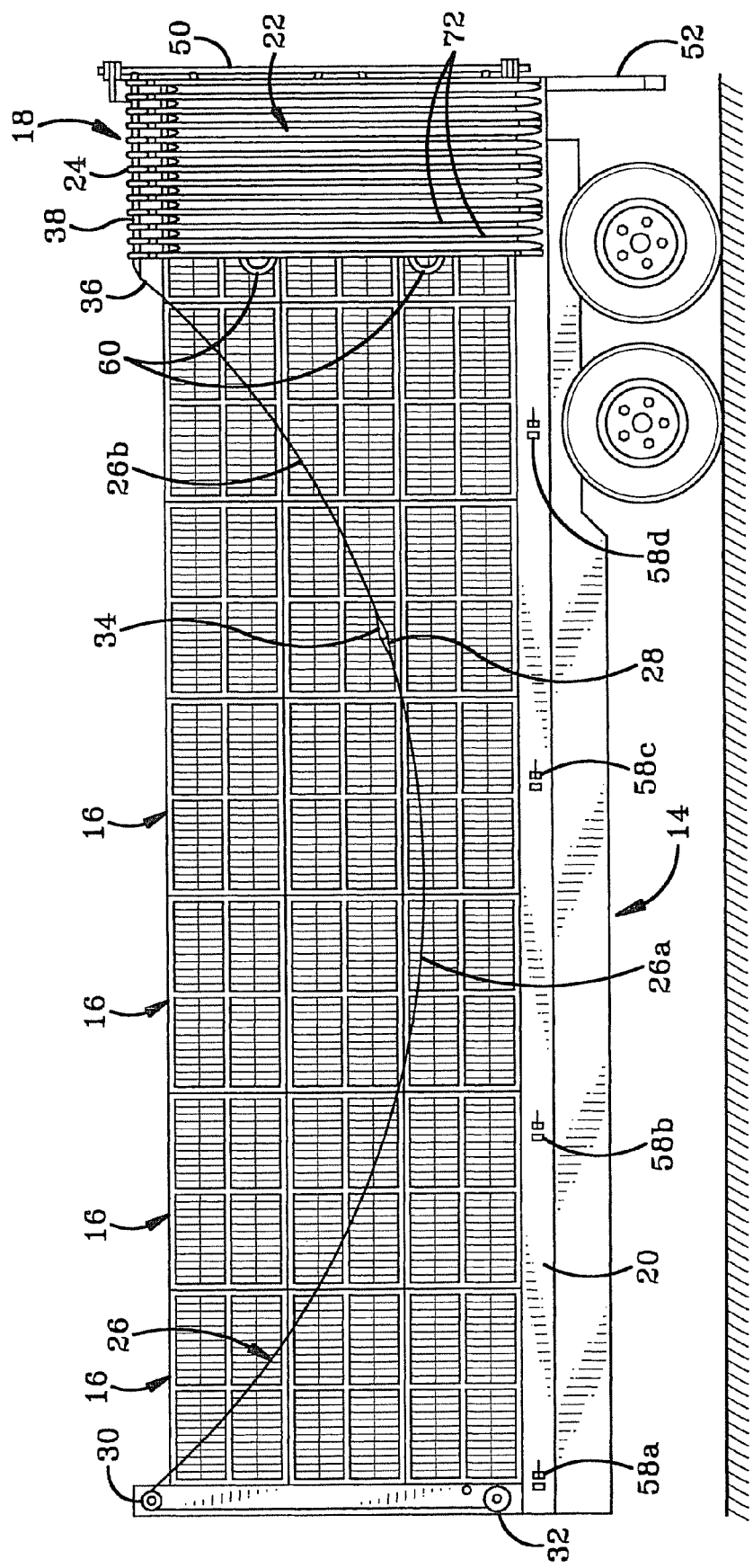
FIG. 13 is side elevational view of the trailer section showing the cable sections joined together.
Figure 14:
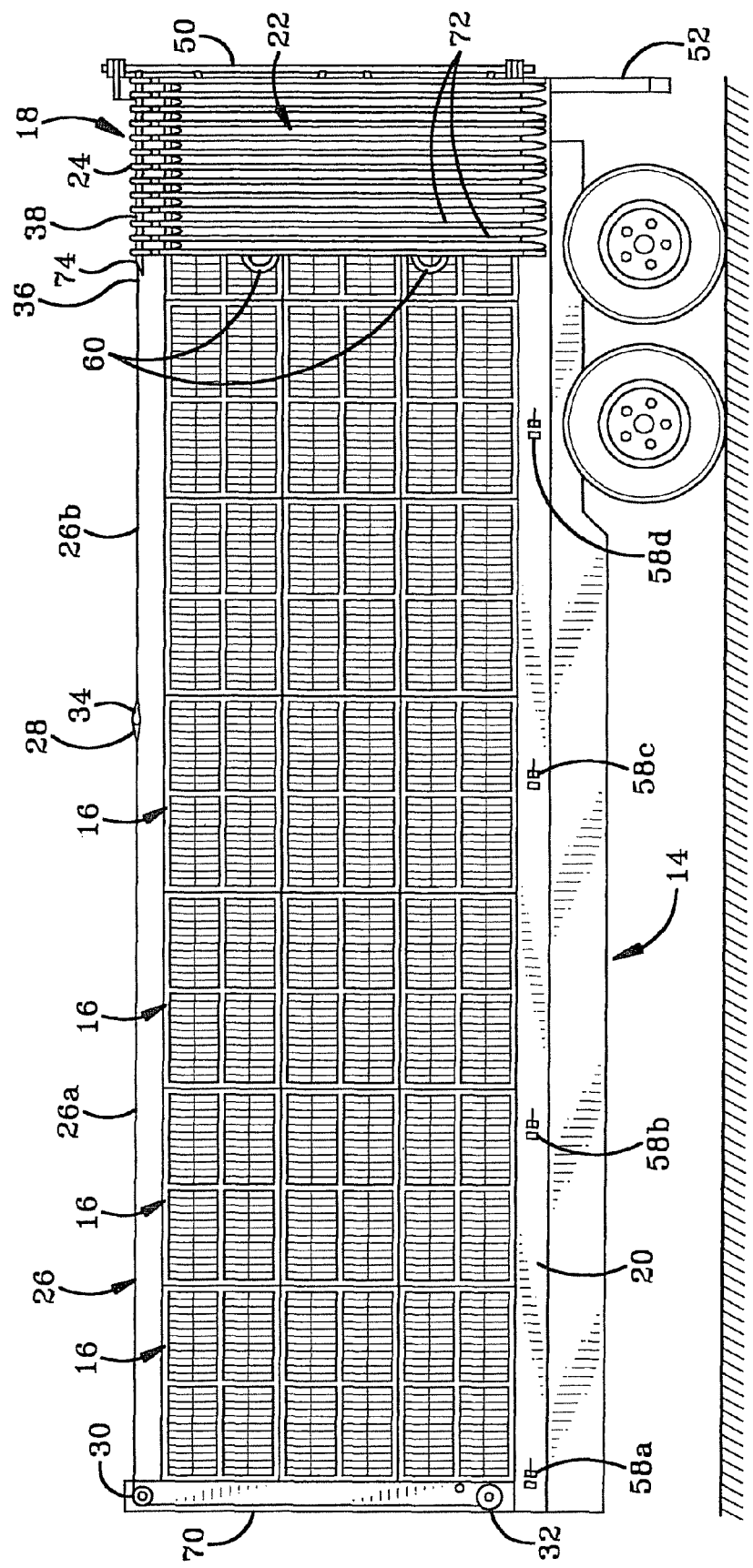
FIG. 14 is a side elevational view of the trailer section showing the cable drawn taut for carrying the tarpaulin.
Figure 15:
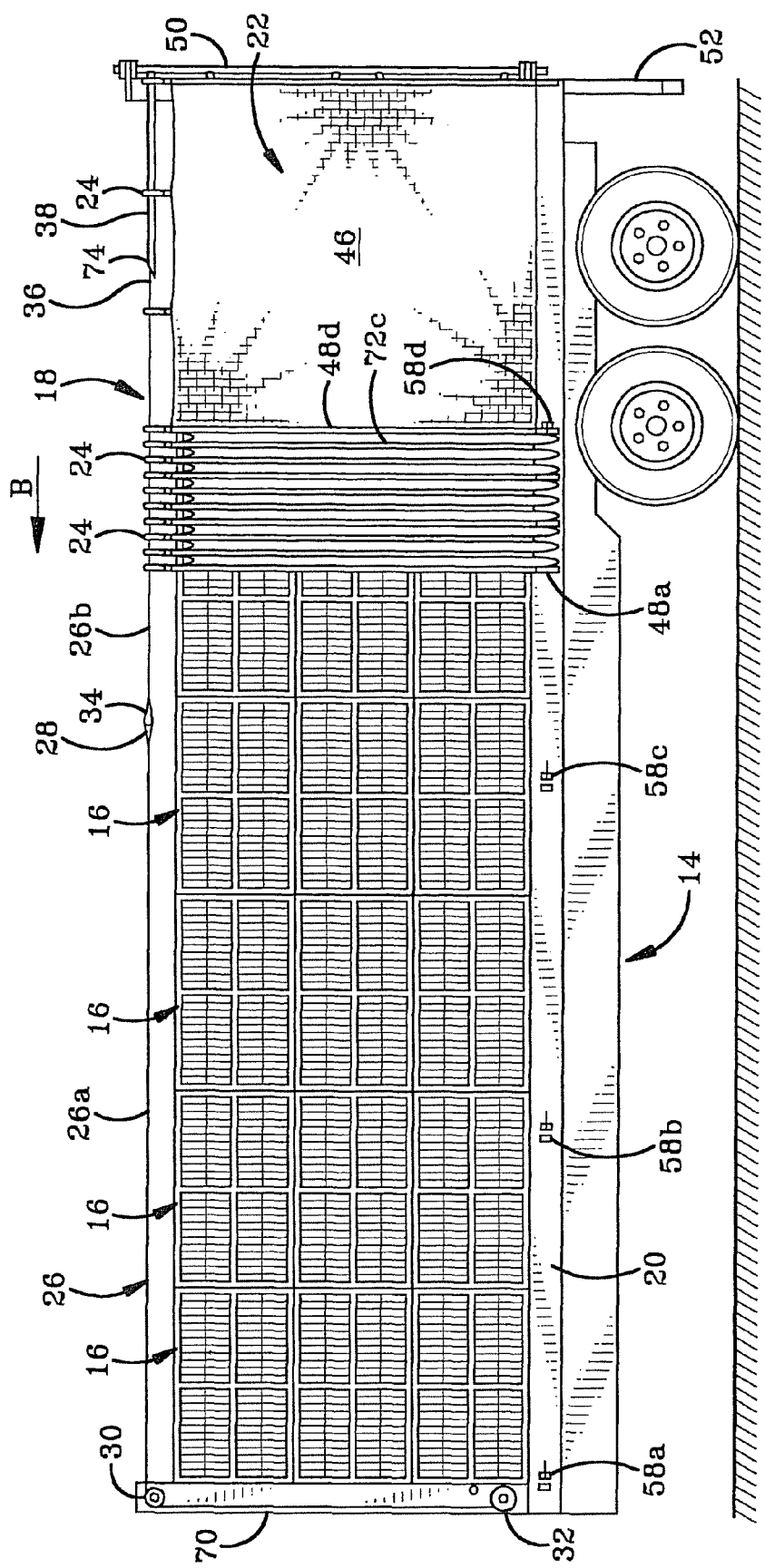
FIG. 15 is a side elevational view of the trailer section showing the tarpaulin drawn toward the front end of the trailer section and with a first panel secured in place.
Figure 16:
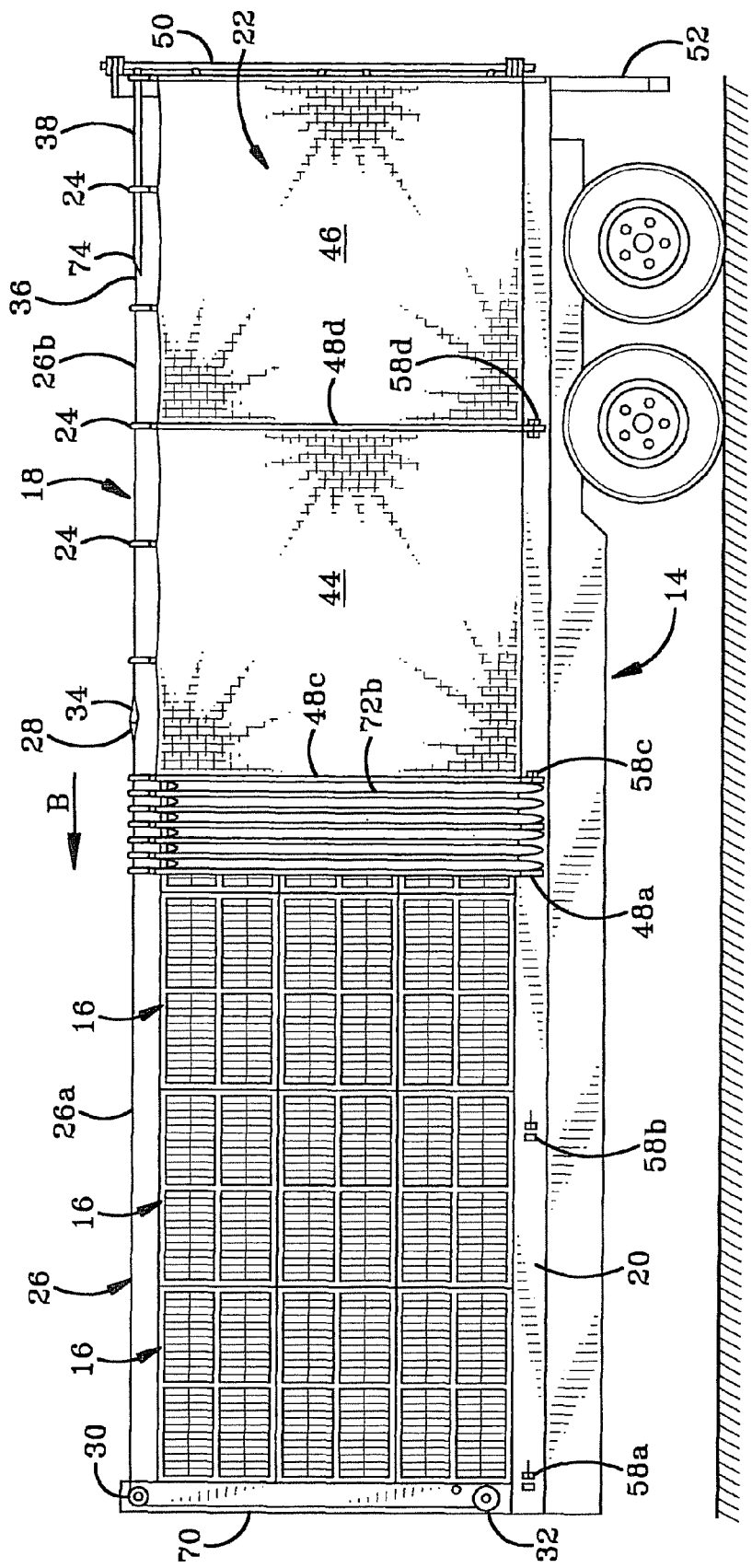
FIG. 16 is a side elevational view of the trailer section showing the tarpaulin drawn closer to the front end of the trailer section and with a second panel secured in place.
Figure 17:
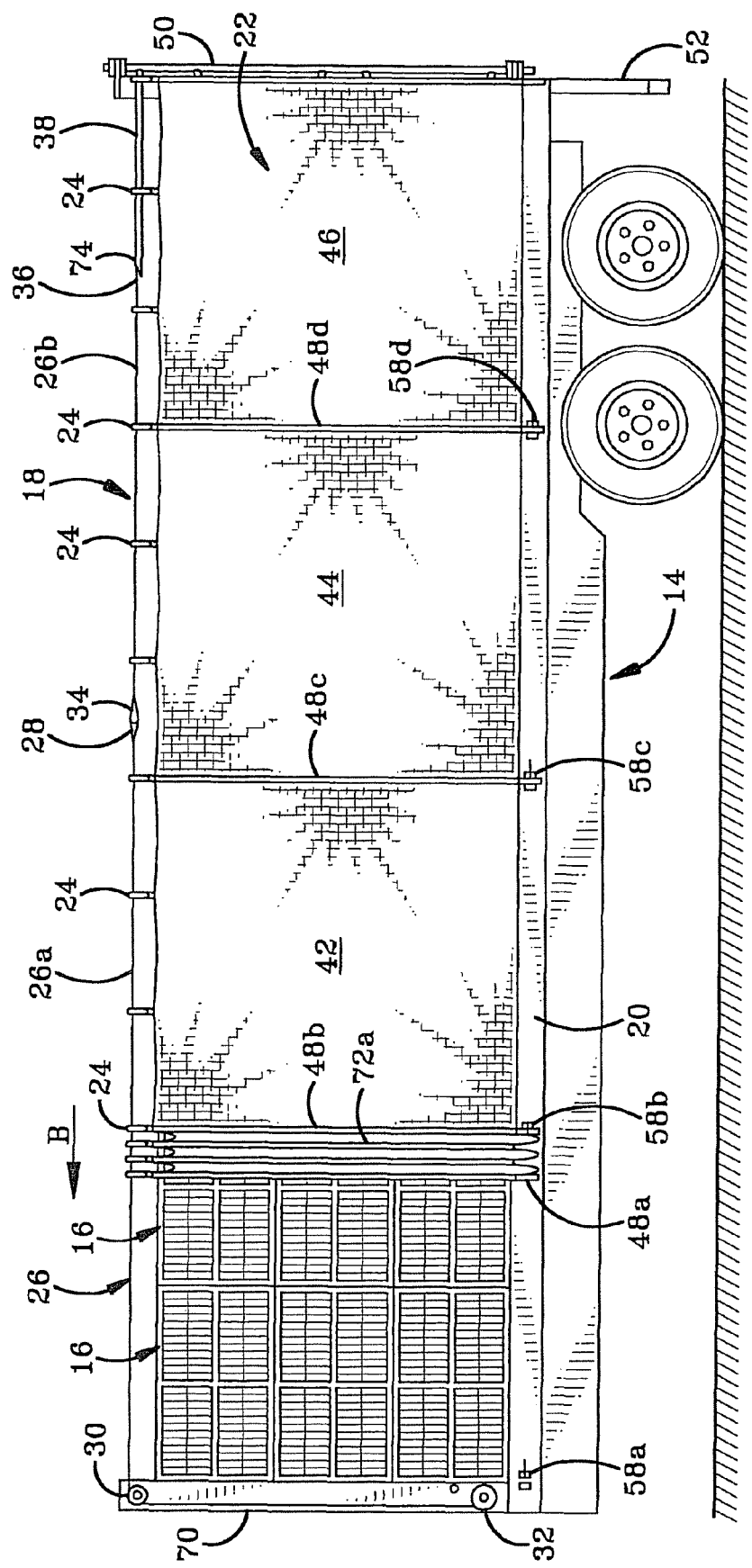
FIG. 17 is a side elevational view of the trailer section showing the tarpaulin drawn even closer to the front end of the trailer section and with a third panel secured in place.
Figure 18:
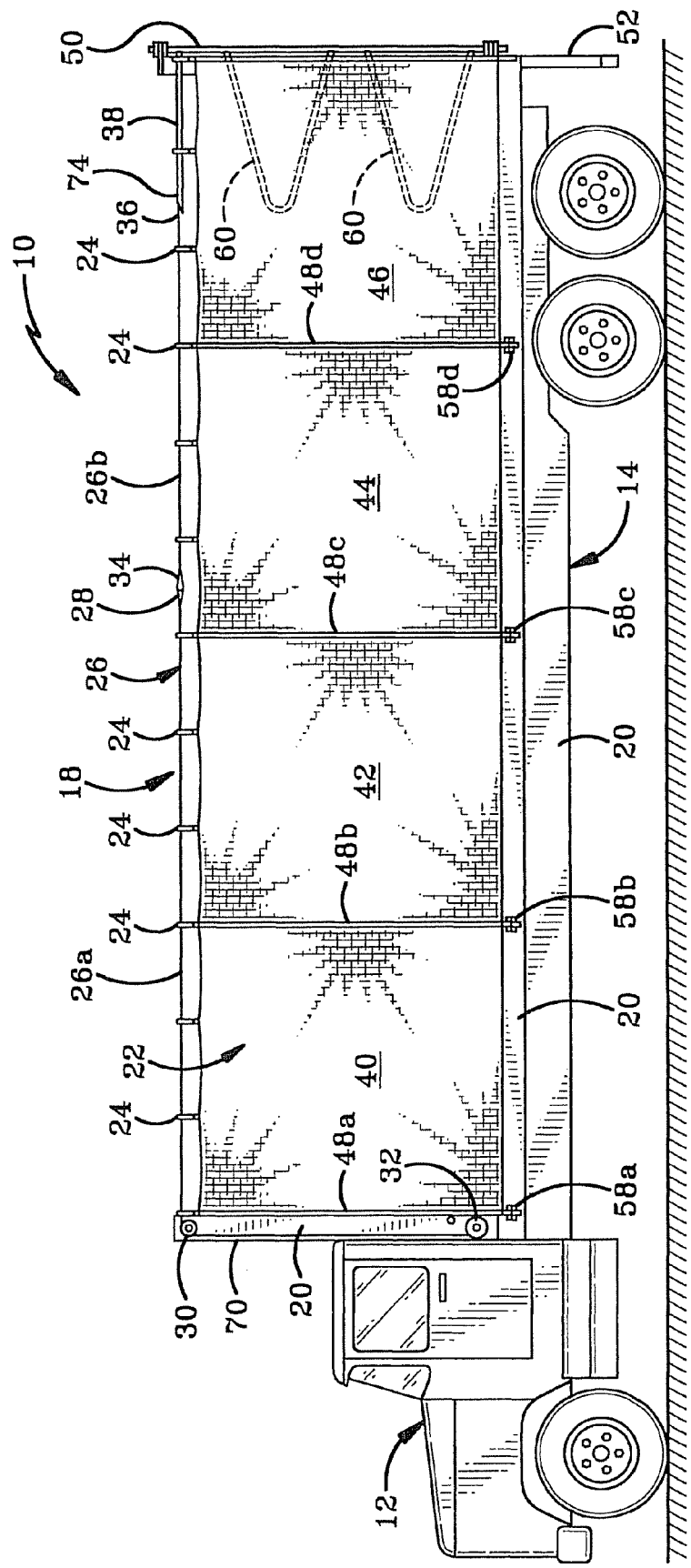
FIG. 18 is a side elevational view of the trailer section with the tarpaulin drawn across the entire length of the side of the trailer section.

Referring to FIGS. 6-18, coop trailer 10 is used to transport poultry in the following manner. Birds, such as chickens or turkeys, are placed in cages 16 to be loaded into coop trailer 10. In order for cages 16 to be loaded onto trailer section 14, tarpaulins 22 have to be in a retracted position. This means that sheets 22 are drawn back toward the rear end 52 of trailer section 14 and preferably are secured in the position shown in FIG. 7, so that they do not interfere with cages 16. Once loaded, cages 16 are secured in place in a conventional manner. Tarpaulin system 18 is then engaged to cover the sides 20 of trailer section 14 and thereby block off access to cages 16 and cut down on the free flow of air through cages 16. The tarpaulin system 18 is engaged as follows. Catches 62, straps 64 and first ends 34 of second cable sections 26b are released so that gates 60 and spars 28 are free to rotate away from rear end 52 of trailer section 14. The operator grasps gates 60 and swings them in the direction of the arrow "A" (FIG. 9) until gates 60 and spars 28 are in contact with sides 20 of trailer section 14 (FIG. 10). Because tarpaulins 22 are held on support spars 38, sheets 22 swing away from rear end 52 of trailer section 14 and into contact with sides 20 of trailer section 14. The operator then engages a motor 68 (FIG. 6) that is operationally connected to lower winch 32, and unwinds a portion of first section 26a of cable 26 from lower winch 32. The first end 28 of first section 26a of cable 26 is then secured to the first end 34 of second section 26b of cable 26 (FIGS. 12 & 13). The operator engages motor 68 to wind up a portion of first section 26a of cable 26 so that the slack in cable 26 is taken up (FIG. 14) and cable 26 is reasonably taut. The operator grasps the foremost stiffening rib 48a (FIG. 15) and walks toward the front end 70 of trailer section 14 in the direction of arrow "B", pulling the rib 48a with him. As he walks toward the front end 70 of trailer section 14, the folds in tarpaulin 22 straighten out and the panels 46, 44, 42 and 40 are sequentially unfolded (FIGS. 15 through 18). When foremost stiffening rib 48a lies in close proximity to front end 70 of trailer section 14 (FIG. 18), the operator secures stiffening rib 48a to connector 58a by engaging bolt 56 against rib 48a (FIG. 5). The operator secures the other stiffening ribs 48b, 48c and 48d to 58bb, 58c and 58d respectively in the same manner. When in this position, tarpaulin system 18 prevents access to cages 16 and furthermore substantially cuts down on the free flow of air through the cages 16. There is a substantial decrease in the number of bird fatalities because the birds inside cages 16 are not being buffeted about by the wind when the coop trailer 10 is traveling on the roads. The fatalities tend to also be reduced because tarpaulins 22 aid in retaining heat within trailer section 14 in the winter and create shade during the summer. It has been found that bird fatalities tend to decrease substantially when the tarpaulin system 18 is engaged.

When the coop trailer's destination is reached, tarpaulins 22 are removed from sides 20 of trailer section 14 to allow access to cages 16. In order to retract sheets 22, bolt 56 is disengaged from connector 58a thereby releasing rib 48a and thereby panel 40 for movement along first section 26a of cable 26. The operator grasps rib 48a and walks toward the rear end 52 of trailer section 14. As he does so, he pulls rib 48a with him causing panel 40 to be drawn backwardly and to form folds 72 (FIGS. 11-17). When rearmost fold 72a of panel 40 reaches secured rib 48b (FIG. 17), connector 58b is loosened. This allows rib 48b and panels 40 and 42 to slide along first section 26a of cable 26. As panel 42 is drawn toward rear end 52 of trailer section 14, it too folds up. When rearmost fold 72b (FIG. 16) of panel 42 reaches next secured rib 48c, connector 58c is loosened. This allows rib 48c and panels 40, 42 and 44 to slide backwards along first section 26a of cable 26, over the connection between ends 28 and 34 of cable 26 and onto second section 26b of cable 26. When rearmost fold 72c reaches secured rib 48d (FIG. 15), connector 58d is loosened so that rib 48d and panels 40, 42, 44 and 46 may slide backwardly. The rings 24 of folded panels 40, 42, 44 and 46 slide onto spar 38 (FIG. 14) until front rib 48a lies rearwardly of the end 74 of spar 38. The tension on cable 26 is released by engaging motor 68 and unwinding a section of cable 26 from lower winch 32. This allows cable 26 to drop downwardly toward the ground giving the operator access to ends 28 and 34 of first and second cable sections 26a, 26b. Ends 28 and 34 are disconnected from each other and motor 68 is engaged to wind some of the cable in first section 26a onto lower winch 32. When first end 28 is disposed proximate lower winch 32, with a segment of cable 26 still wrapping around upper pulley 30, first end 28 is attached to a pin 76 (FIG. 11) to lock end 28 in place.

Figure 11:
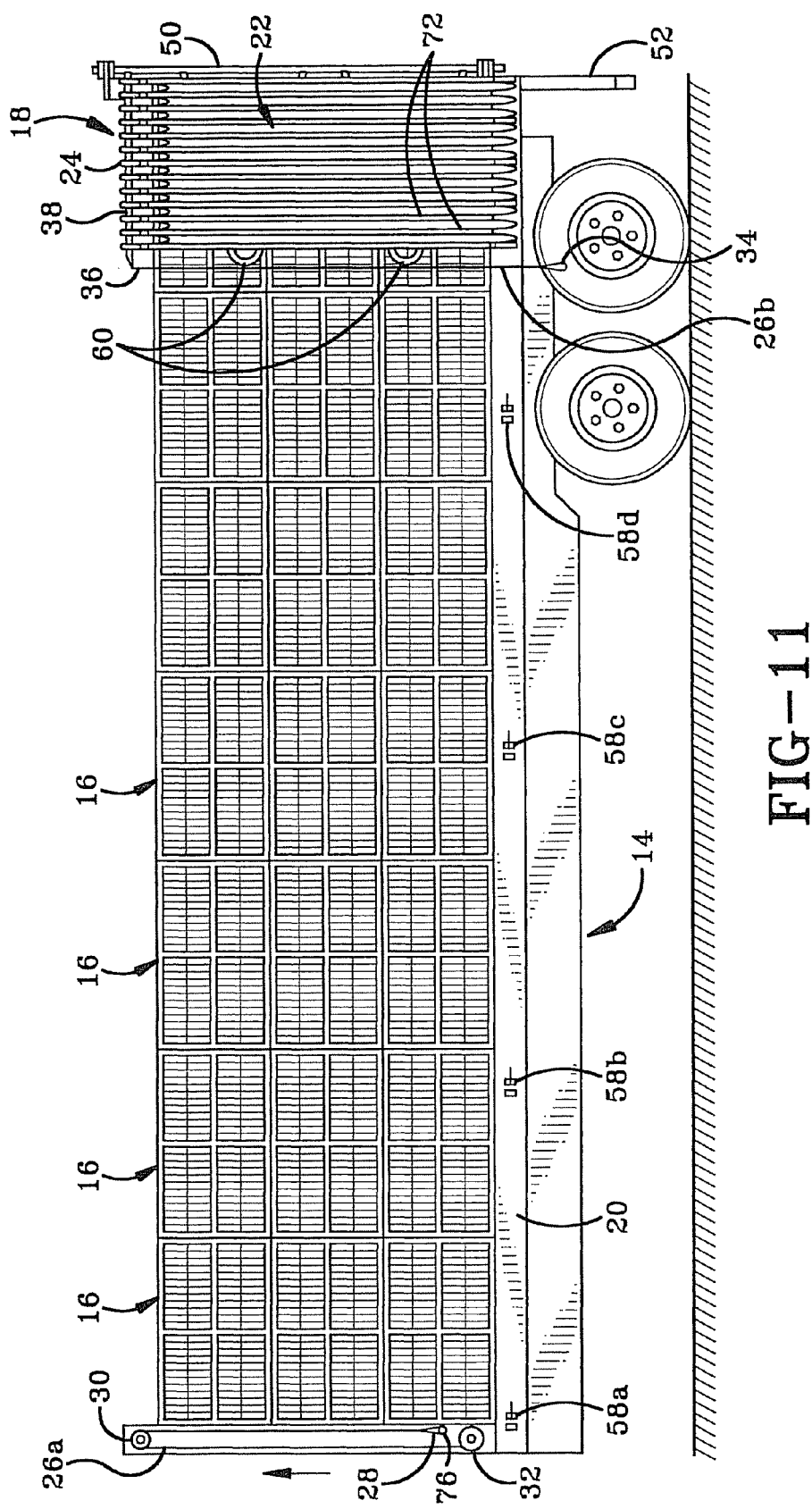
FIG. 11 is a side elevational view of the trailer section showing tarpaulin on the support spars as in FIG. 10.

At this point, each tarpaulin 22 is folded up and is held on one of the spars 38 as is shown in FIG. 11. The operator then grasps rib 48a or gate 60 and walks toward the rear end 52 of trailer section 14, rotating spar 38 and gate 60 from the position shown in FIG. 10 to the position shown in FIG. 8. Once sheet 22 abuts rear end 52 of trailer section 14, gates 60 are secured against tarpaulins 22 by catches 62. Straps 64 are positioned and fastened to hold tarpaulins 22 against rear end 52 of trailer section 14. Furthermore, each first end 34 of second cable sections 26b is drawn across the respective tarpaulin 22 (FIG. 7) and is secured to a pin 66. This aids in holding sheets 22 in place and also secures cables 26 so that they do not flap around or interfere with the removal of any cages 16 from coop trailer 10. At this stage, sides 20 of trailer section 14 are open and the cages 16 containing the birds can be easily accessed and removed from the trailer section 14. Once cages 16 have been unloaded, the poultry can be removed from cages 16.

It will be understood that instead of the operator physically manipulating tarpaulins 22 by holding ribs 48 and walking along the sides 20 of trailer section 14, the movement of ribs 48 and therefore sheet 22 may be motor-driven. Furthermore, a handle or some other grasping device may be provided on rib 48a to aid in physically manipulating tarpaulin 22. It will be understood that tarpaulins 22 may also be only partially drawn across or retracted along the sides 20 of trailer section 14. If this is the case, then foremost rib 48a may be secured to any one of connectors 58b, 58c and 58d.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A method of transporting poultry in a coop trailer, said method comprising the steps of:

loading a plurality of poultry coops onto a bed of an open-sided trailer; where the trailer has a first end, a second end and a longitudinal axis extending therebetween;

drawing a pair of cable-supported tarpaulins between the first end and the second end of the trailer so that each of the tarpaulins at least partially covers one of the open-sides thereof, including the step of moving each tarpaulin from a storage position where the tarpaulin is disposed at an angle to the longitudinal axis of the trailer; to an initial unfolding position where the tarpaulin is disposed substantially parallel to the longitudinal axis of the trailer; and when the tarpaulins at least partially cover one of the open sides of the trailer they shield the poultry coops on the bed;

driving the trailer to a remote destination;

withdrawing at least one of the tarpaulins by moving the tarpaulin outwardly away from one of the open sides and at an angle to the longitudinal axis of the trailer; whereby substantially the entire bed of the trailer is made accessible; and unloading the poultry coops.

2. The method of transporting poultry as defined in claim 1, wherein the step of drawing the tarpaulins between the first and second ends includes sliding each tarpaulin along a cable that is disposed between the first and second ends of the trailer.

3. The method of transporting poultry as defined in claim 1, wherein the alignment of the storage position is substantially at ninety degrees to the longitudinal axis of the trailer.

4. The method of transporting poultry as defined in claim 3, wherein the first end of the trailer is the rear end thereof and the storage position is rearward of the rear end; and wherein the step of moving each of the tarpaulins from the storage position to the initial unfolding position includes the step of swinging an arm supporting the stored tarpaulin thereon from adjacent the rear end to adjacent one of the open sides of the trailer.

5. The method of transporting poultry as defined in claim 1, wherein the step of withdrawing the tarpaulin includes the step of moving a section of the cable outwardly away from the open side of the trailer and at an angle to the longitudinal axis thereof with the tarpaulin when it is moved outwardly away from the open side of the trailer.

6. The method of transporting poultry as defined in claim 5, wherein the step of moving the tarpaulin outwardly away from one of the open sides of the trailer is preceded by the step of gathering the tarpaulin onto a swing arm disposed proximate one of the first and second ends of the trailer.

7. The method of transporting poultry as defined in claim 6, further comprising the step of detaching a connector at an end of the section of the cable prior to the step of moving the section of the cable with the tarpaulin outwardly away from the open side of the trailer.

8. The method of transporting poultry as defined in claim 6, further comprising the step of swinging the arm supporting the gathered tarpaulin thereon from adjacent one of the open sides of the trailer to adjacent one of the first and second ends of the trailer and thereby into a storage position.

9. The method of transporting poultry as defined in claim 8, further comprising the step of securing the swing arm against subsequent movement away from its storage position adjacent the one of the first and second ends of the trailer.

* * * * *